United States Patent Office 3,159,476
Patented Dec. 1, 1964

3,159,476
METHOD OF INHIBITING THE SPROUTING OF POTATOES
David W. Young, Homewood, Ill., assignor to Sinclair Research, Inc., Wilmington, Del., a corporation of Delaware
No Drawing. Filed July 5, 1962, Ser. No. 207,806
4 Claims. (Cl. 71—2.7)

The present invention relates to an improved method of preventing or inhibiting the sprouting of potato tubers on potatoes during storage.

There are currently available several methods of preventing the premature sprouting of potato tubers on potatoes while in storage awaiting human consumption. Premature sprouting not only makes potatoes unsightly hence less salable but it results in increased loss of moisture and shriveling. Potatoes so affected are practically worthless.

One method proposed to maintain potatoes in their most edible and salable condition while in storage consists of dusting the potatoes either by hand or by mechanical means, with a composition consisting of 2,3,5,6-tetrachloronitrobenzene as the active component in an inert pulverulent carrier. Another dusting method consists of applying to the potatoes, particularly seed potatoes, 1,1,2,3,3,4,5,5-octachlorpentene-1 blended with an inert carrier such as talcum powder. Still another method consists of dusting potatoes with a spray or dust with a phenolic ether, iso-eugenol methyl ether and the like. All these methods possess an inherent shortcoming in that there is present a distinct possibility that the ultimate consumer may receive potatoes destined for human consumption whose skins are contaminated by the anti-sprouting agent, and as a consequence may lead to health problems. It has been established that the various anti-sprouting agents currently proposed possess toxicity to human beings. When employed in concentrations to prevent anti-sprouting, the toxicity may be sufficiently low; however, there is a possibility that if the repeated consumption of such treated potatoes is continued, the body intake of the various anti-sprouting agents may accumulate in time to manifest definite toxic effects.

It has also been proposed, in order to overcome the health problems of the foregoing anti-sprouting agents, to employ the vapors of saturated aliphatic alcohols. The use of such vapors could obviate any serious possibility of the potato skins subsequently being contaminated. It has been known that n-amyl alcohol, oxononyl alcohol, isooctyl alcohol and C$_{10}$ oxo alcohol have been used to treat potatoes or potato tubers. All these methods possess a disadvantage in that the agents used usually act only by killing potato sprouts on contact after they have started to grow, that is they merely inhibit the growth of sprouts.

It has now been found that in addition to inhibiting the growth of sprouts, sprouting may be prevented, that is there is evidence that a significant decrease or suppression of sprouts from even starting to grow may be accomplished by exposing the potatoes or potato tubers to isooctenyl alcohol. In any event the use of this alcohol results in a lesser amount of tubers. In the treatment, the potatoes may be exposed to the alcohol in a liquid or vapor form. For instance, an absorbent material, such as cotton, may be impregnated or saturated with the alcohol and brought into contact with the potatoes by, for instance, rolling the potatoes over the absorbent material.

The alcohol may also be applied to the potatoes in the form of a spray or mist. Another method of exposing the potatoes to the alcohol is to permit the alcohol to drop in liquid form on a hot surface placed in the center of the potatoes and let the vapors of the alcohol penetrate all about and through the potatoes piled around the hot surface. In the case of large containers such as warehouse storage bins and the like, the isooctenyl alcohol may be vaporized by heating and vapors circulated with fans to effect suitable contact with the stored potatoes. In any case it is recommended that air be allowed free entrance to the storage or warehouse compartments or that when the treated potatoes are packaged they are not placed in air tight containers.

In the treatment of potatoes or potato tubers the amount of isooctenyl alcohol applied to prevent or inhibit the sprouting is sufficient to give the desired effect and usually is about 0.01–1 part by weight alcohol per 1000 parts by weight of potatoes. Frequently potatoes are stored at a relative humidity of about 15 to 70%.

In comparative experiments the unsaturated aliphatic alcohol of this invention, i.e. isooctenyl alcohol, as opposed to the known anti-sprouting agents, for instance isooctyl alcohol demonstrated its surprisingly superior effectiveness in preventing or inhibiting the sprouting of potato tubers while securing the other advantages available through the use of saturated alcohols.

The isooctenyl alcohol of this invention can be made by chlorinating di-isobutylene and subsequently hydrolyzing the chlorinated di-olefin to produce a mixture of (a)
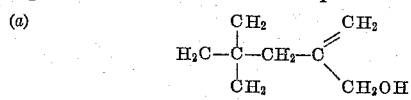

(2-hydroxymethyl, 4,4 dimethyl pentene-1)

(b)
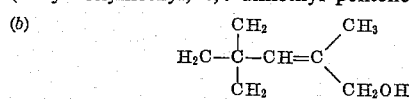

(2 hydroxymethyl, 4, 4- dimethyl pentene-2) wherein the ratio of amounts of the (a) alcohol to the (b) alcohol is about 1.75 to 1.

To illustrate the practice of this invention, the following examples are given.

EXAMPLES I–III

Potatoes in a well vented container were treated with isooctenyl alcohol comprising 2-hydroxymethyl, 4, 4 dimethyl pentene-1 and 2 hydroxymethyl-4, 4 dimethyl pentene-2 in a ratio of about 1.75/1 of the former to the latter and isooctyl alcohol. The treated potatoes were stored for a 60 day period at a temperature of about 25° C. and a relative humidity of 50%. About 52 grams liquid alcohol per ton of potatoes were vaporized by contacting it dropwise with a hot plate placed in the center of the potatoes. At the end of the test period the container was opened, the sprouts were severed from each potato and the weight determined. The results are found below in Table I.

EXAMPLES IV–VI

Potato tubers were rolled over a mat of cotton saturated with the isooctenyl alcohol of Examples I–III and then placed in a well-ventilated container maintained at a temperature of about 15° C. and a relative humidity of about 15% for a 60 day period. At the end of this test period the container was opened and the sprouts were cut off the potato tubers and weighed. These results also appear in Table I.

Table I

| Run | Chemical | Weight of Sprouts (lbs.) per 1,000 lbs. of potatoes |
|---|---|---|
| 1 | Blank | 97 |
| 2 | Isooctyl alcohol | 8 |
| 3 | Isooctenyl alcohol | 3 |
| 4 | Blank | 17 |
| 5 | Isooctyl alcohol | 3/8 |
| 6 | Isooctenyl alcohol | 1/16 |

From the foregoing experiments it is clearly apparent that the method of the present invention is particularly adaptable for the application of isooctenyl alcohol in preventing or inhibiting the sprouting of potato tubers and potatoes.

It is claimed:

1. The method of inhibiting the sprouting of potatoes which comprises applying to said potatoes in an amount sufficient to inhibit sprouting isooctenyl alcohol selected from the group consisting of 2-hydroxymethyl-4, 4 dimethyl pentene-1 and 2-hydroxymethyl-4, 4 dimethyl pentene-2.

2. The method of claim 1 in which the amount of alcohol employed is about 0.01–1 part by weight per 1000 parts by weight of said potatoes.

3. The method of claim 1 wherein the isooctenyl alcohol is applied by contacting potatoes with an absorbent material saturated with the said alcohol.

4. The method of claim 1 wherein the isooctenyl alcohol is applied by vaporizing the said alcohol and contacting the potatoes with the resulting vapor.

References Cited in the file of this patent

UNITED STATES PATENTS

| 2,695,841 | Koopmans | Nov. 30, 1954 |
| 3,025,150 | Hessel | Mar. 13, 1962 |

FOREIGN PATENTS

| 721,208 | Great Britain | Jan. 5, 1955 |

OTHER REFERENCES

Science News Letter, vol. 70, No. 5, page 70, August 1956.